US012606065B2

(12) United States Patent
Sadoo et al.

(10) Patent No.: US 12,606,065 B2
(45) Date of Patent: Apr. 21, 2026

(54) VEHICULAR SEAT SUSPENSION SYSTEM FOR BELTED SEATS

(71) Applicant: Tesla, Inc., Austin, TX (US)

(72) Inventors: Olav Sadoo, San Jose, CA (US);
Nishanth Bhat, Oakland, CA (US);
Collin Johnston, San Jose, CA (US)

(73) Assignee: Tesla, Inc., Austin, TX (US)

( * ) Notice: Subject to any disclaimer, the term of this patent is extended or adjusted under 35 U.S.C. 154(b) by 184 days.

(21) Appl. No.: 18/408,004

(22) Filed: Jan. 9, 2024

(65) Prior Publication Data

US 2025/0222840 A1 Jul. 10, 2025

(51) Int. Cl.
| | |
|---|---|
| *B60N 2/50* | (2006.01) |
| *B60N 2/52* | (2006.01) |
| *B60R 22/26* | (2006.01) |
| *A47C 3/20* | (2006.01) |
| *A61G 5/14* | (2006.01) |

(52) U.S. Cl.
CPC ............. *B60N 2/509* (2013.01); *B60N 2/501* (2013.01); *B60N 2/502* (2013.01); *B60N 2/525* (2013.01); *B60R 22/26* (2013.01); *A47C 3/20* (2013.01); *A61G 5/14* (2013.01)

(58) Field of Classification Search
CPC ........ B60N 2/501; B60N 2/505; B60N 2/509; B60N 2/525; B60N 2/52; B60N 2/522; B60N 2/527; B60N 2/77; B60N 2/163; A47C 3/20; A47C 3/24; A47C 3/26; A47C 3/30; A47C 3/40; A61G 5/14; B60R 22/06
See application file for complete search history.

(56) References Cited

U.S. PATENT DOCUMENTS

| | | | |
|---|---|---|---|
| 2,484,722 A | | 10/1949 | Nickelsen et al. |
| 4,350,368 A | * | 9/1982 | Frantom ................. B60R 22/06 |
| | | | 280/804 |
| 5,732,370 A | * | 3/1998 | Boyle .................... B60N 2/525 |
| | | | 267/136 |
| 5,737,780 A | * | 4/1998 | Okita ................... A61G 7/1019 |
| | | | 4/667 |

(Continued)

FOREIGN PATENT DOCUMENTS

| | | |
|---|---|---|
| CN | 107128215 | 9/2017 |
| EP | 0437130 | 7/1991 |

(Continued)

OTHER PUBLICATIONS

"International Application Serial No. PCT US2024 062419, International Search Report mailed May 9, 2025", 4 pgs.

(Continued)

*Primary Examiner* — Syed A Islam
(74) *Attorney, Agent, or Firm* — Schwegman Lundberg & Woessner, P.A.

(57) ABSTRACT

Vehicular seat suspension systems that do not include scissor mechanisms or pivot joints to improve lateral stability and substantially eliminate deflection during operation, testing and/or crashes. In particular, the seat suspension systems include an inner element that is able to slide within a static outer element, allowing the system to bear high loads while ensuring lateral stability and substantially eliminating deflection experienced by convention seat suspension systems.

20 Claims, 12 Drawing Sheets

(56)         References Cited

U.S. PATENT DOCUMENTS

| | | | |
|---|---|---|---|
| 7,748,769 B2* | 7/2010 | Sommer | B60N 2/77 |
| | | | 296/153 |
| 2014/0263933 A1* | 9/2014 | Bauman | B63B 29/00 |
| | | | 248/636 |

FOREIGN PATENT DOCUMENTS

| | | |
|---|---|---|
| JP | H0443524 | 4/1992 |
| WO | 2025151309 | 7/2025 |

OTHER PUBLICATIONS

"International Application Serial No. PCT US2024 062419, Written Opinion mailed May 9, 2025", 7 pgs.

* cited by examiner

130

154

155

152

430

480

156

158

490

VEHICULAR SEAT SUSPENSION SYSTEM FOR BELTED SEATS

BACKGROUND

The typical automotive seat suspension system involves the use of scissor mechanisms with deleveraged air spring and dampers. These typically use pneumatic air springs and viscous oil dampers, and most controls available on the seat are manually adjustable. However, scissor mechanisms are known to have poor lateral stability due to the sheer number of pivot joints that move to allow the seat to be raised and lowered. In order for these systems to be used in heavy-duty vehicles, such as a semi-truck, they must pass the Federal Motor Vehicle Safety Standards (FMVSS) 207/210 (Seatbelt anchorage strength). While many scissor mechanisms pass the test, they experience a high level of deflection, which may result in the system being unusable after a similar occurrence on the road. While suspension seats are relatively common in trucks and heavy-duty vehicles, there is a need for them in high-end luxury automotive markets. As such, there is a need and desire for an improved seat suspension system that does not have the problems associated with the use of a scissor suspension mechanism.

SUMMARY

The current disclosure is directed to vehicular seat suspension systems that do not include scissor mechanisms or pivot joints to improve lateral stability and substantially eliminate deflection during e.g., crashes and testing. In particular, the present disclosure is directed towards seat suspension systems including an inner element that is able to slide within a static outer element allowing the system to bear high loads while ensuring lateral stability and substantially eliminating deflection experienced by conventional seat suspension systems.

In one or more embodiments, a vehicular seat suspension system includes a dynamic seatbelt retractor. In one or more embodiments, a vehicular seat suspension system includes a damper element. The linkage of the damper element may be configured to provide a progressive damping response to the vehicular seat suspension travel, which increases the magnitude of the damping force at the seat when approaching the end of the travel. In one or more embodiments, a vehicular seat suspension system includes a vertical displacement member. The vertical displacement member may have 1:1 travel with attachment to the outer and inner elements of the suspension system, which provides a more consistent spring rate when compared to conventional scissor lift mechanisms.

In some embodiments, a vehicular seat suspension system is provided. The system includes an outer element adapted to be coupled to a floor of a vehicle, an inner element adapted to be coupled to a seat pan and configured to be slideably engaged within the outer element, and a spring housed within and coupled to the inner element, the spring being adapted to control vertical displacement of the inner element and the seat pan.

In some embodiments, a vehicular seat suspension system further includes at least one linear motion element adapted to guide the vertical displacement of the inner element.

In some embodiments, a vehicular seat suspension system further includes a seat belt retractor housed in the inner element, the seat belt retractor coupled to the inner element.

In some embodiments, a vehicular seat suspension system further includes a damper coupled to the seat pan, the damper further coupled to the outer element.

In some embodiments, a vehicular seat suspension system further includes an interlocking mechanism engaged between the inner element and the outer element.

In some embodiments, a vehicular seat suspension system is provided. The system includes an outer element adapted to be coupled to a floor of a vehicle, an inner element adapted to be coupled to a seat, the inner element configured to slide within the outer element, and a vertical displacement member housed within and coupled to the inner element, the vertical displacement member being adapted to control vertical displacement of the inner element and the seat pan.

FIGURES

DETAILED DESCRIPTION

The present disclosure is generally directed to vehicular seat suspension systems that facilitate lateral stability of the seat, facilitate fore and aft stability of the seat, such as during a front-end crash, and substantially eliminate the displacement that occurs with incumbent seat suspension systems.

Significantly, the conventional scissor lift mechanism is replaced with a sliding mechanism that is configured to provide fore/aft and lateral stability. In addition, a seat belt and retractor may be integrated onto the seat which ensures no relative motion between the seat occupant and the seatbelt retractor.

The system comprises an outer element which may be coupled to a seat track subassembly of a vehicle, an inner element which is configured to be slideably engaged within the outer element, and at least two bearing stacks configured to be engaged between the inner element and the outer element. In some embodiments, there are four bearing stacks configured to be engaged between the inner element and the outer element. In some embodiments, the outer element comprises a front outer element and a rear outer element. In some embodiments, the outer element is a vertically static element, meaning it does not move along a Z axis while it may move along an X axis along the seat track subassembly. In some embodiments, each bearing stack comprises a linear motion element and cage assembly, two steel races configured to allow the linear motion element to slide or roll along them, and a compliant shim configured to absorb any dimensional variation in the spacing between the outer element and the inner element. In some embodiments, each of the at least two bearing stack includes a linear motion element, which may be at least one of a linear bearing, electromagnetic tracks, a needle bearing, and/or a dry bearing. In some embodiments, the inner element defines a cavity. In some embodiments, the cavity may house a seatbelt retractor and an air spring. In some embodiments, the cavity may house a seatbelt retractor and an electromagnetic system configured to control the vertical displacement of the seat in the Z-direction.

Figure 1:
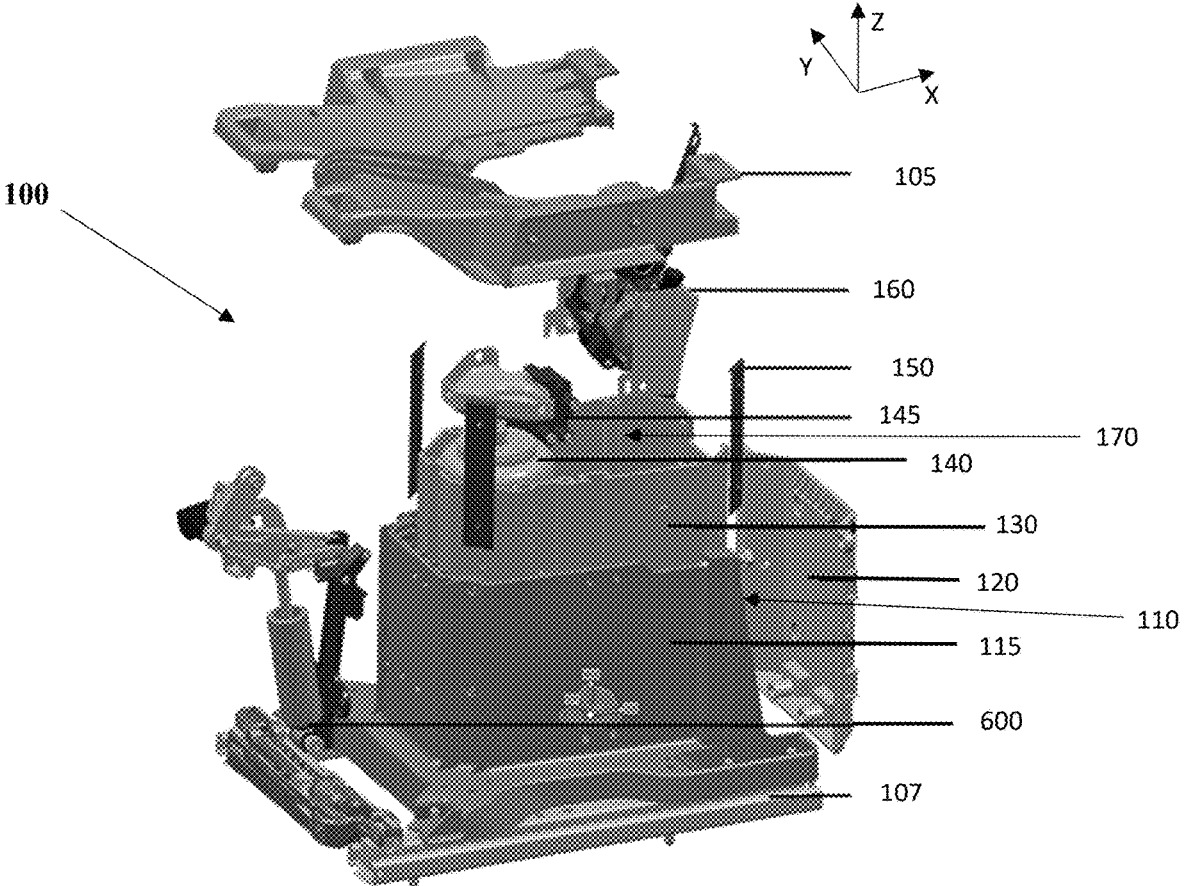
FIG. 1 depicts a view of an illustrative suspension system for use with a vehicular seat, in accordance with an embodiment of the current disclosure.

Referring now to FIG. 1, an illustrative vehicular seat suspension system 100 is shown. Outer element 110 may be configured to be coupled to a seat track subassembly 107, which may be coupled to the floor of a vehicle. In some embodiments, outer element 110 comprises a front outer element 115 and a rear outer element 120. The rear outer element 120 may be configured to be coupled to the front outer element 115, together forming the outer element 110. Inner element 130 may be configured to be slideably engaged within outer element 110. Inner element 130 may be configured to be coupled to a seat pan 105. A person of ordinary skill in the art will understand that the relationship of the inner element 130 and the outer element 110 may be switched such that the inner element 130 may be configured to be coupled to the seat track subassembly 107 and the outer element 110 may be configured to be coupled to the seat pan 105.

At least two bearing stacks 150 may be located in between the outer element 110 and the inner element 130. In some embodiments, the at least two bearing stacks 150 may include at least one of a linear bearing, an electromagnetic track, a needle bearing and/or a dry bearing. In some embodiments, there may be four bearing stacks 150, such as in the embodiment shown in FIG. 1. In some embodiments, the four bearing stacks 150 may be positioned at each of the four corners of the outer element 110. In some embodiments, the four bearing stacks 150 may be angled at approximately a 45-degree angle relative to the X and Y axes (as shown in FIG. 2).

In some embodiments, the inner element 130 defines a cavity 170. In some embodiments, a spring 140 is coupled to the inner element 130 and may be housed in the cavity 170. The spring 140 may be adapted to control vertical displacement of the inner element 130 and the seat pan 105.

The spring 140 may be any one of an air spring or an electromagnetic suspension system. In some embodiments, the spring 140 is a pneumatic air spring, which may be coupled to a valve block 145. The spring 140 being coupled to the inner element 130 provides the inner element 130 the ability to move along the Z axis when the spring is either compressed or extended. A valve block 145 may also be housed within the cavity 170. In some embodiments, a seatbelt retractor 160 may be housed within the cavity 170, which allows the seatbelt to be supported only by the seat without requiring a structure outside of the seat, such as a wall of the vehicle. The inner element 130 may be configured to be coupled to the seat pan 105, which allows the seat pan 105 to move along the Z axis with the inner element 130 (discussed in greater detail below with respect to FIG. 4A). In the illustrated embodiment, the seatbelt retractor 160 may be connected to the inner element 130 below the seat pan 105. In some embodiments, the inner element 130 may be coupled to the seat pan 105 with bolts and/or screws such that the seat may bear the heavy load required under FMVSS 207/210 without breaking off of the inner element 130. In some embodiments, the outer element 110 may be formed of at least one of metal and/or high strength plastics. In some embodiments, the inner element 130 may be formed of at least one of metal and/or high strength plastics. In some embodiments, the metal may be one of aluminum and/or steel.

Figure 2:
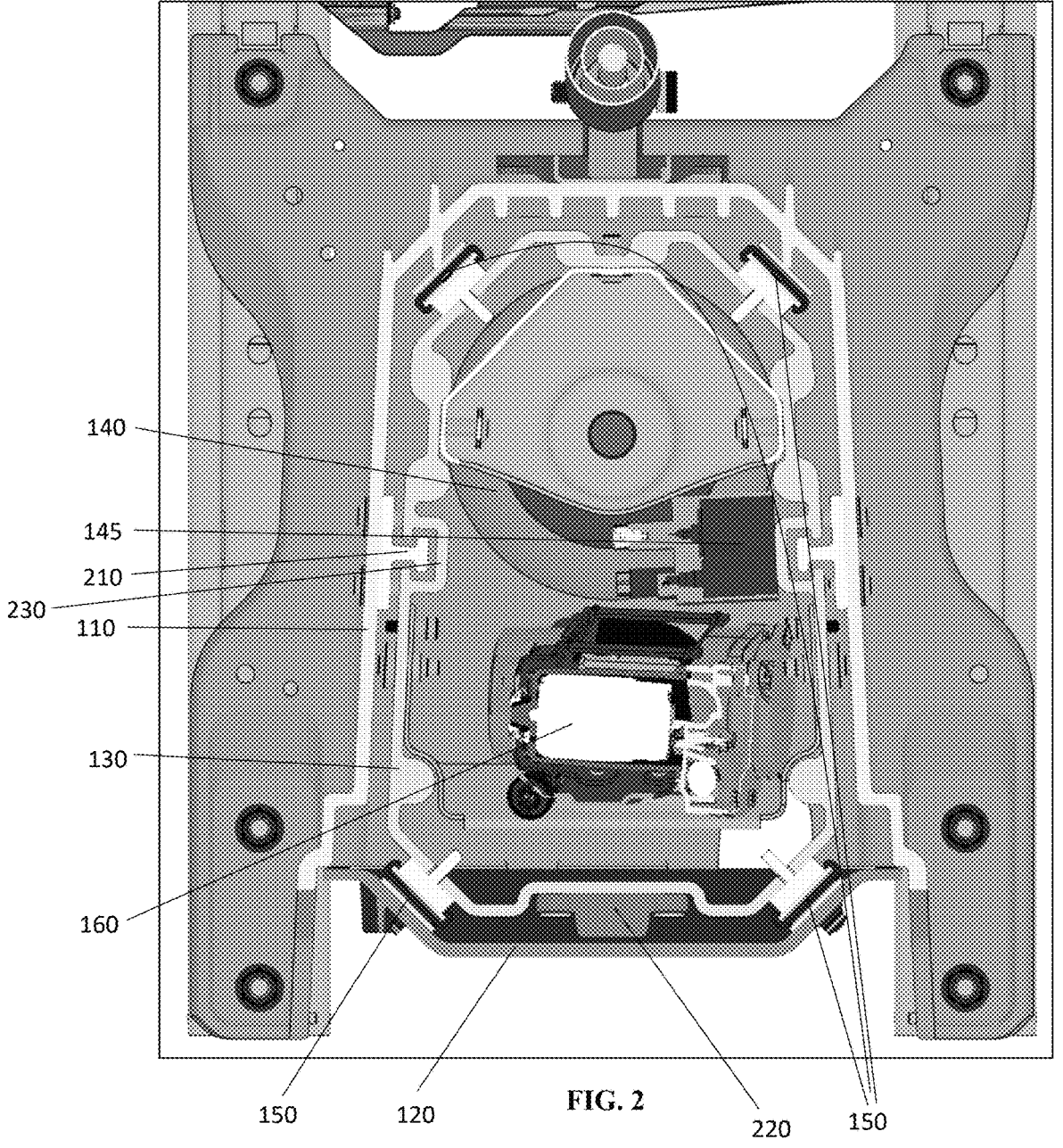
FIG. 2 depicts a cross-sectional view in an X, Y plane of the system, in accordance with an embodiment of the current disclosure.

Referring now to FIG. 2, there is shown a cross-sectional view of the example system 100 in an X-Y plane. In some embodiments, the system 100 may include an interlocking element to prevent the inner element 130 from escaping the outer element 110. In some embodiments, the interlocking element comprises a T-shaped member 210 coupled to the outer element 110 and a C-shaped feature 230 on the inner element 130 configured to receive the T-shaped member 210. In some embodiments, the T-shaped member 210 may be held with a nominal clearance of the C-shaped feature 230 during regular operation of the system 100. In the event of a fore/aft force acting on the vehicular seat pan 105, such as in the seatbelt anchorage strength test, the T-shaped member 210 and the C-shaped feature 230 may come into contact, thereby effectively acting as a braking mechanism to prevent the inner element 130 from exiting the outer element 110. In some embodiments, there may be a plurality of interlocking elements located around the system 100. In some embodiments, there may be one T-shaped member 210 and one C-shaped feature 230 opposed to each other across the inner element 130.

Figure 5A:
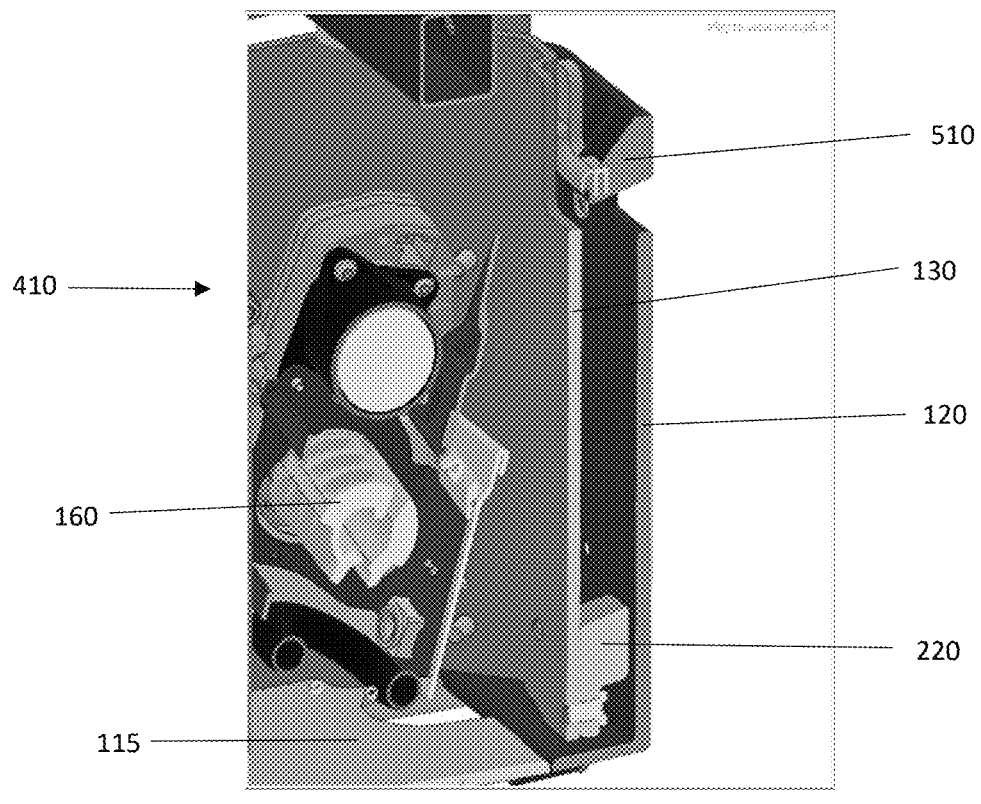
FIG. 5A depicts a cross-sectional view of a rear end stop in a fully compressed state, in accordance with an embodiment of the current disclosure.
Figure 5B:
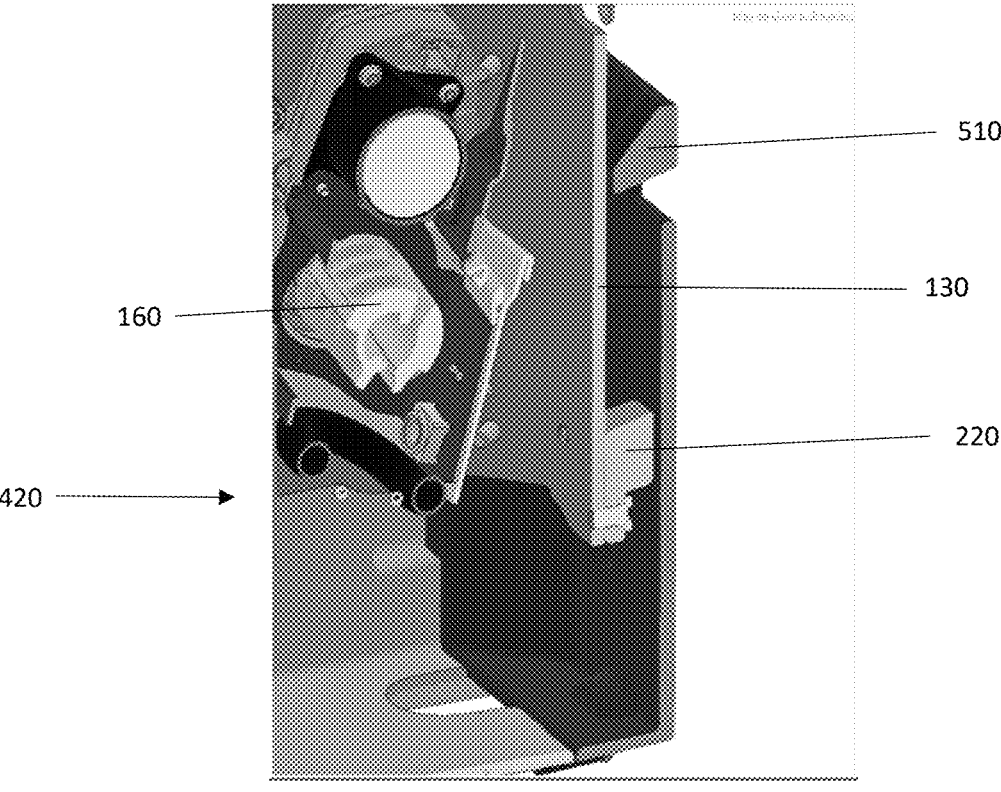
FIG. 5B depicts a cross-sectional view of a rear end stop in a partially compressed state, in accordance with an embodiment of the current disclosure.
Figure 5C:
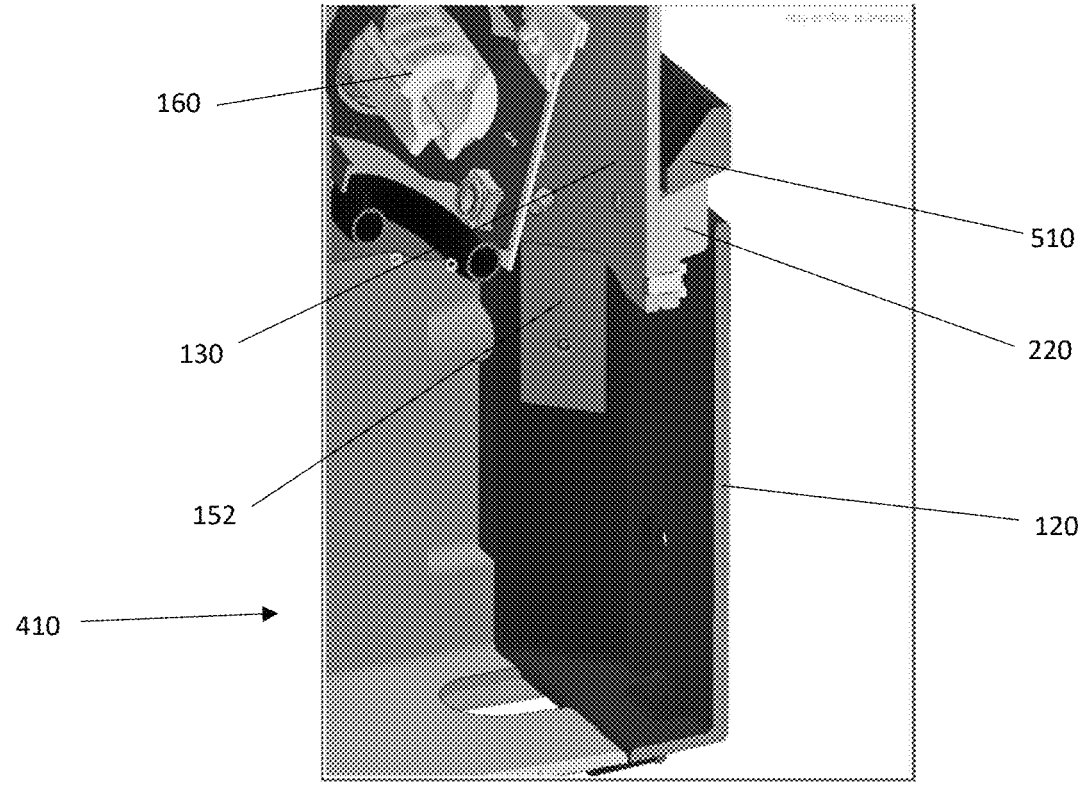
FIG. 5C depicts a cross-sectional view of a rear end stop in a fully extended state, in accordance with an embodiment of the current disclosure.

As shown in FIGS. 2 and 5C, in some embodiments, an interlocking element may comprise a rear end stop 220 coupled to the inner element 130 and an overhang 510 coupled to the rear outer element 120. In some embodiments, the overhang 510 may be formed in one piece with the rear outer element 120. During a fully extended state 430 of the system 100, the rear end stop 220 and the overhang 510 may be in contact to prevent any further movement in the +Z direction. The overhang 510 is also configured to prevent the inner element 130 from exiting the outer element 110.

As shown in FIG. 2, in some embodiments, the system 100 may include four bearing stacks 150, each located at a corner of the outer element 110. In some embodiments, the inner element 130 may house the spring 140 and the seatbelt retractor 160. In some embodiments, the spring 140 may be an air spring, and the inner element 130 may also house a valve block 145 configured to be connected to the air spring. The air spring height may be controlled in a closed-loop manner using a position sensor and solenoid valves in the valve block 145 to fill and exhaust air from the spring. An occupant may adjust the height of the seat electronically using this system. In some embodiments, the spring 140 may have 1:1 travel with direct attachment to the outer element 110 and the inner element 130. This may provide a more consistent spring rate for a given occupant within the seat height adjust window when compared to scissor-lift mechanisms.

Figure 3:
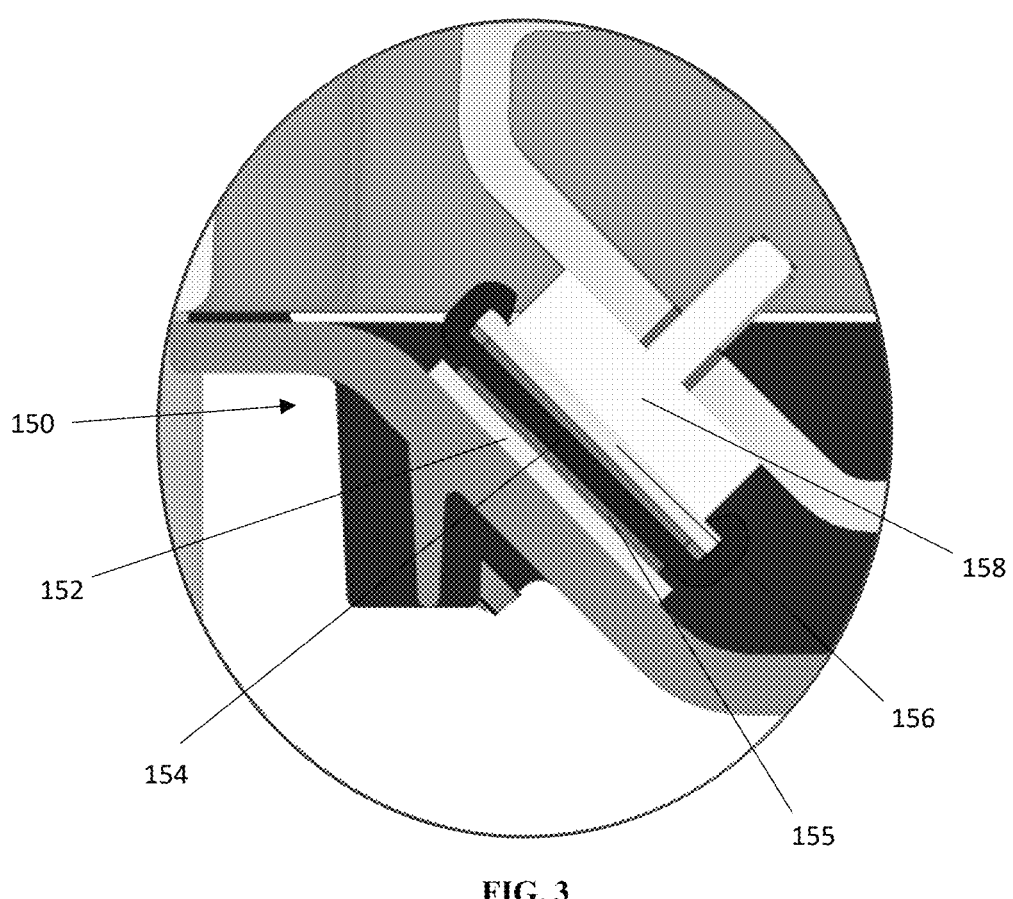
FIG. 3 depicts an enlarged view of one of the bearing stacks shown in FIG. 2, in accordance with an embodiment of the current disclosure.

Referring now to FIG. 3, there is shown an enlarged view of an illustrative bearing stack 150 such as one of the stacks 150 shown in FIG. 2. According to the present disclosure, each bearing stack 150 may be comprised of a first race 152 coupled to the outer element 110, a cage 154, at least one linear motion element 155 retained by the cage 154, a second race 156, and a compliant shim 158 configured to be coupled between the second race 156 and the inner element 130. The illustrated bearing stack 150 is adapted to guide the vertical displacement of the inner element 130 and allows the inner element 130 to slide along the Z axis relative to the outer element 110. The first race 152 and the second race 156 may be formed from steel, aluminum, and/or plastic. In some embodiments, the linear motion element 155 may be at least one of a linear bearing, an electromagnetic track, a needle bearing, and/or a dry bearing. The compliant shim 158 allows for low-friction operation of the system 100 and may absorb dimensional variation in the spacing between the inner element 130 and the outer element 110. In some embodiments, there are four bearing stacks 150. In some embodiments, the four bearing stacks 150 are each configured to be placed in one of four regions of the outer element 110. In some embodiments, the four regions may be the four corners of the outer element 110. In some embodiments, the four bearing stacks 150 are each placed at a corner of the outer element 110 such that a face of each bearing stack 150 is facing at a 45-degree angle relative to the X and Y axes, which allows for load bearing in both the X and Y axes, while providing low-friction motion of the inner element 130 along the Z axis.

Figure 4A:
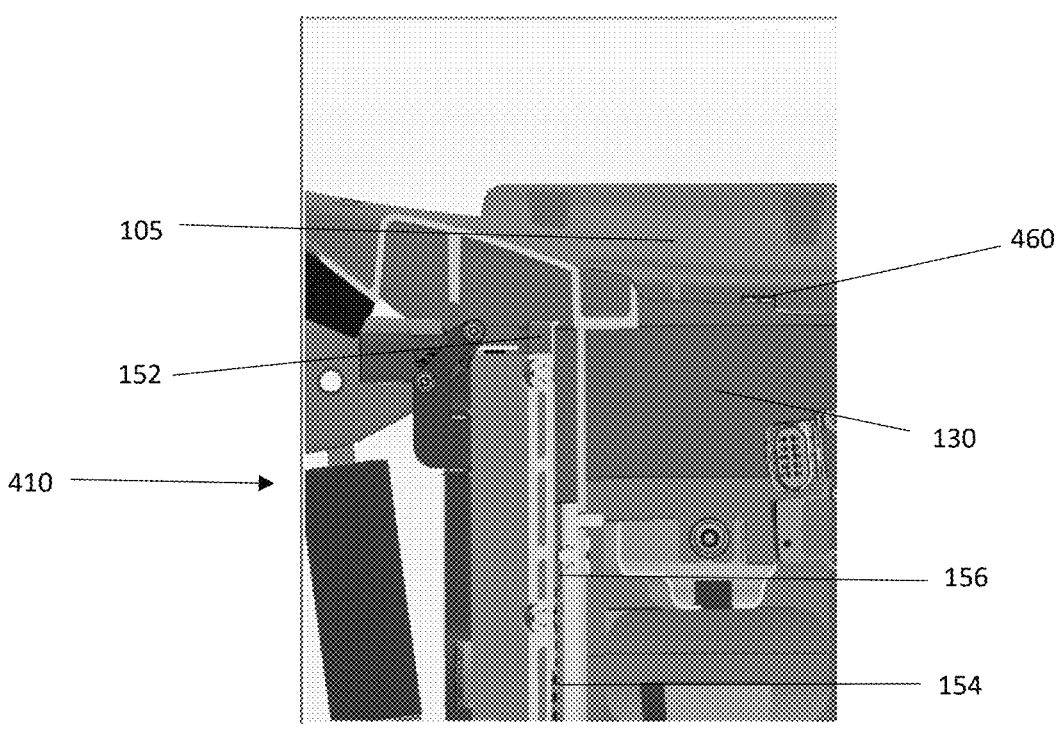
FIG. 4A depicts a cross-sectional view of an illustrative bearing stack in a fully compressed state, in accordance with an embodiment of the current disclosure.

Referring now to FIG. 4A, there is shown a cross-sectional view of an illustrative bearing stack 150 during a fully compressed state 410 of the system 100. In the fully compressed state 410, the second race 156 may be further down in the −Z direction than the first race 152. In some embodiments, the cage 154 may partially extend further along the −Z axis than the first race 152 while not extending further than the second race 156.

As shown in FIG. 4A, in some embodiments, the seat pan 105 may be coupled to the inner element 130 using at least a first connector 460. The first connector 460 may be one of a screw and/or a bolt.

Figure 4B:
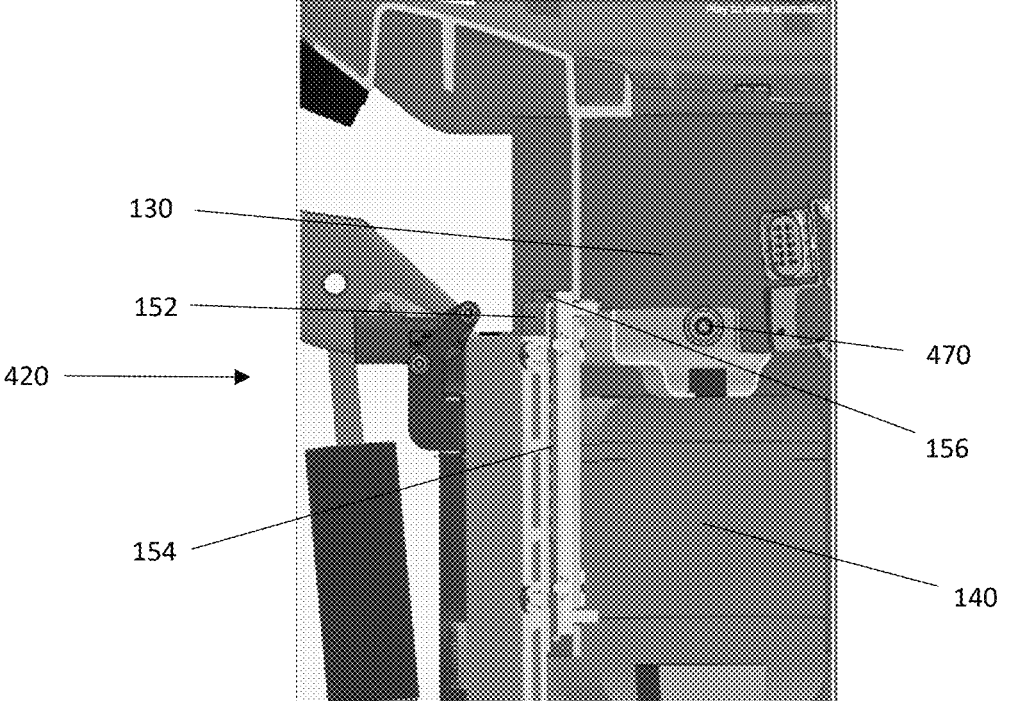
FIG. 4B depicts a cross-sectional view of an illustrative bearing stack in a partially compressed state, in accordance with an embodiment of the current disclosure.

Referring now to FIG. 4B, there is shown a cross-sectional view of an illustrative bearing stack 150 during a partially compressed state 420 of the system 100. In the partially compressed state 420, the second race 156 may be at about the same position along the Z axis as the first race 152. In some embodiments, during the partially compressed state 420, the cage 154 may not extend beyond either the first race 152 or the second race 156.

As shown in FIG. 4B, in some embodiments, the spring 140 may be coupled to the inner element 130 using at least a second connector 470. The second connector 470 may be one of a screw and/or a bolt.

Figure 4C:
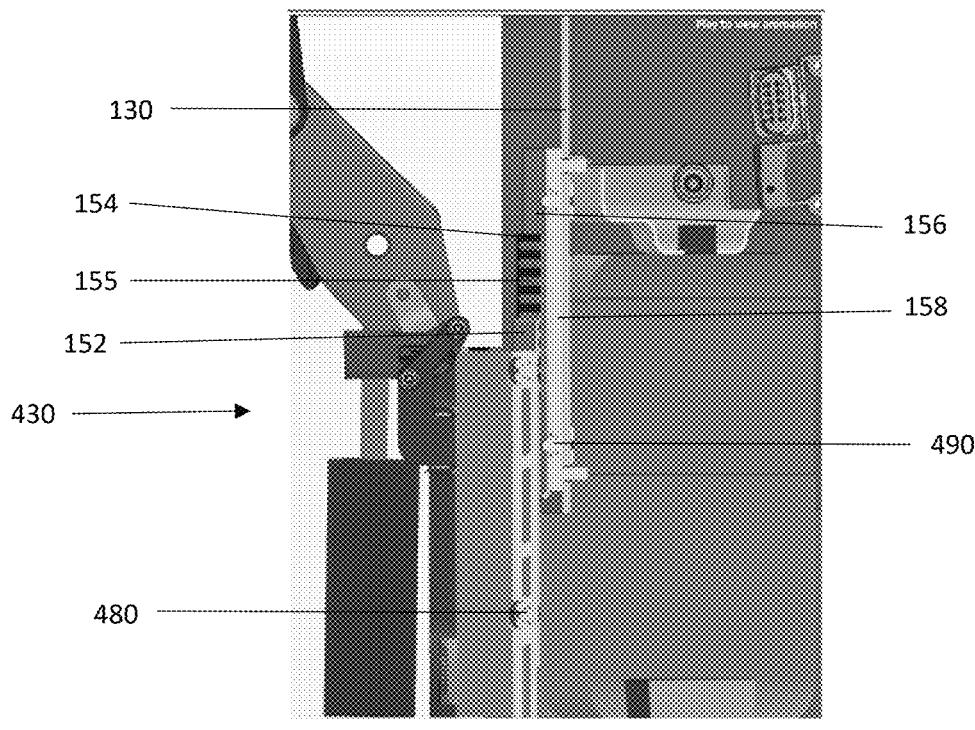
FIG. 4C depicts a cross-sectional view of an illustrative bearing stack in a fully extended state, in accordance with an embodiment of the current disclosure.

Referring now to FIG. 4C, there is shown a cross-sectional view of an illustrative bearing stack 150 during a fully extended state 430 of the system 100. In the fully extended state 430, the second race 156 may be further up in the +Z direction than the first race 152. In some embodiments, during the fully extended state 430, the cage 154 may extend further along the +Z axis relative to the first race 152, but not relative to the second race 156.

As shown in FIG. 4C, in some embodiments, the first race 152 may be coupled to the outer element 110 using at least a third connector 480. In some embodiments, the second race 156 may be coupled to the inner element 130 using at least a fourth connector 490. The third connector 480 and the fourth connector 490 may be one of a screw and/or a bolt. In some embodiments, a compliant shim 158 may be coupled in between the second race 156 and the inner element 130 to absorb dimensional variation in the spacing between the outer element 110 and the inner element 130. The compliant shim 158 may be coupled to the second race 156 and the inner element 130 using the same fourth connector 490.

Referring now to FIGS. 5A, 5B, and 5C, there is shown a cross-sectional view of a rear end stop 220 during the fully compressed state 410, partially compressed state 420, and a fully extended state 430, respectively. In some embodiments, the seatbelt retractor 160 may be coupled to the inner element 130, as shown by comparing the different states 410, 420, 430. The seatbelt retractor 160 being coupled to the inner element 130 allows the seatbelt retractor 160 to maintain a position relative to the seat pan 105, thereby providing little to no relative motion of the seatbelt on the shoulder of an occupant of the seat pan 105 during movement along the Z axis. As shown in FIG. 5B, the rear end stop 220 may be coupled to the inner element 130. As shown in FIG. 5C, the first race 152 may be coupled to the outer element 110.

Figure 6A:
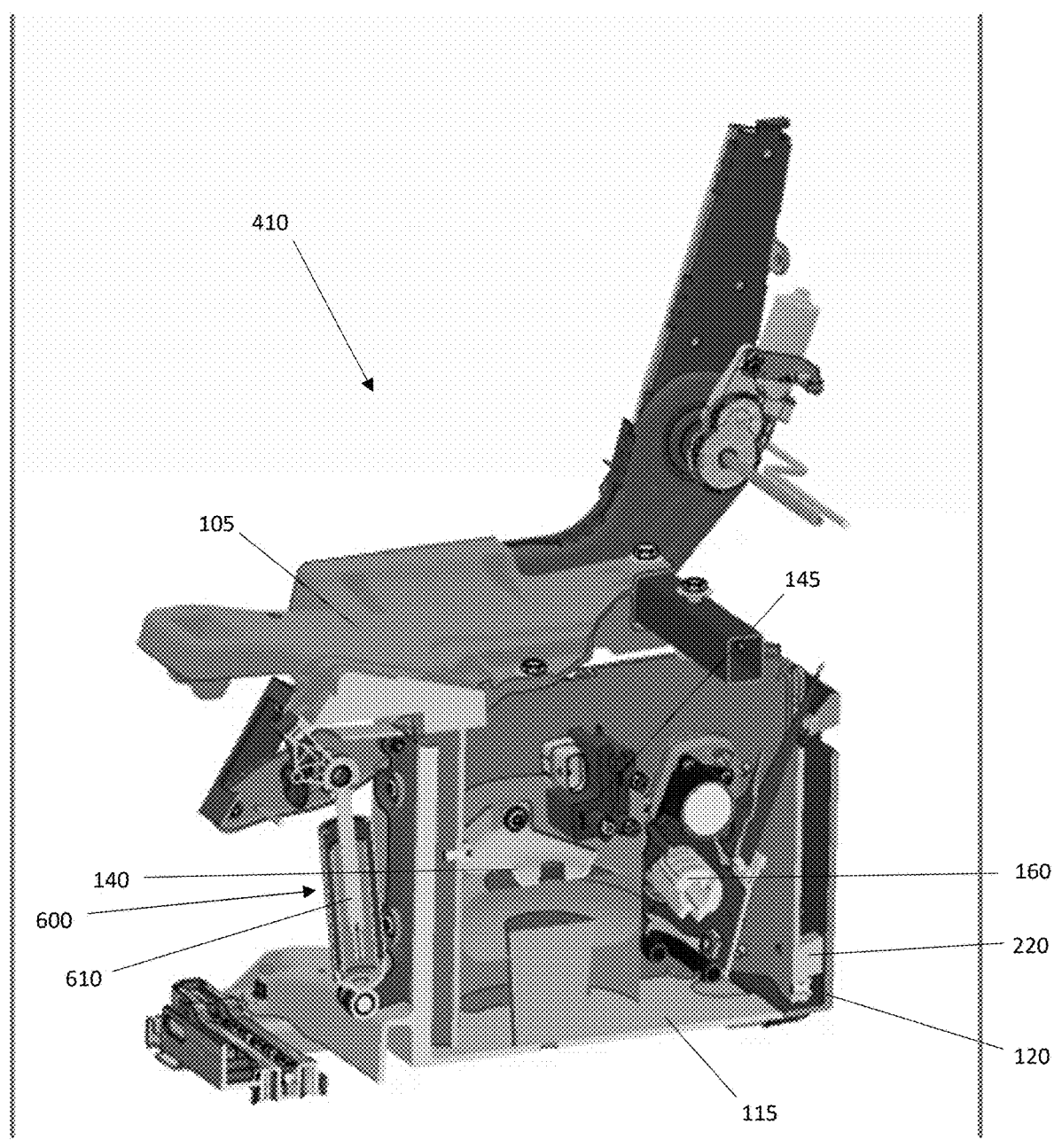
FIG. 6A depicts a cross-sectional view of the system deployed in a vehicular seat in a fully compressed state, in accordance with an embodiment of the current disclosure.

Referring now to FIG. 6A, there is shown a cross-sectional view of an illustrative system 100 deployed as a vehicular seat when the system 100 is in the fully compressed state 410. The system 100 may include a damper subassembly 600. In some embodiments, the damper subassembly 600 may include a crank-slider linkage 610. The crank-slider linkage 610 allows the stroke and length requirements of the damper subassembly 600 to be reduced for easier mechanical packaging. In some embodiments, the damper subassembly 600 may be outside of the outer element 110 and the inner element 130. This provides easy access to change out any parts of the damper subassembly 600 to change the damping forces. The damping forces may be tuned without changing the internal damping valves by making small adjustments to the link lengths and attachment points of the damper subassembly's 600 various parts. The damping forces affect the suspension performance of the system 100. In some embodiments, the damper subassembly 600 may be coupled to the outer element 110.

Figure 6B:
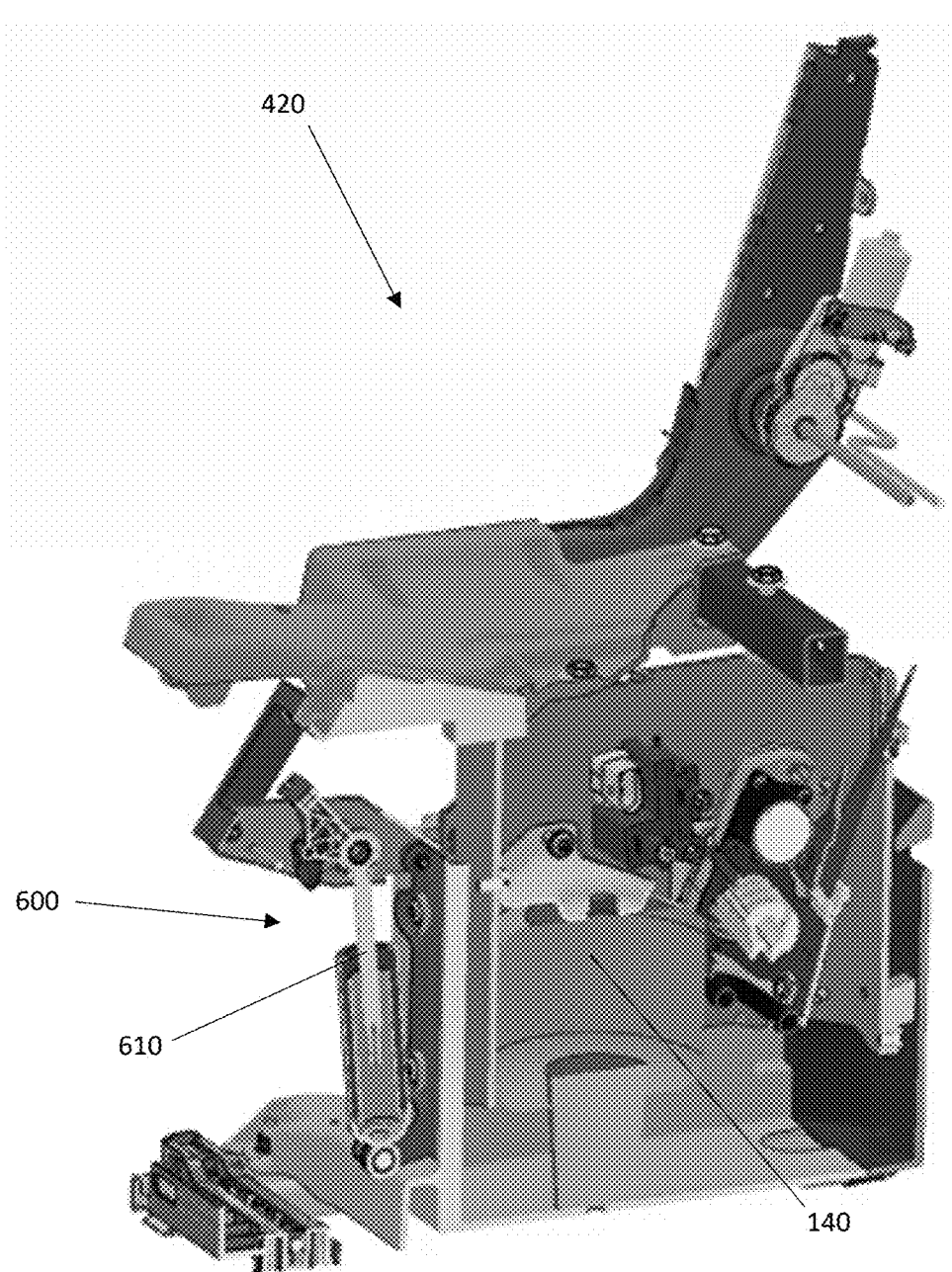
FIG. 6B depicts a cross-sectional view of the system deployed in a vehicular seat in a partially compressed state, in accordance with an embodiment of the current disclosure.
Figure 6C:
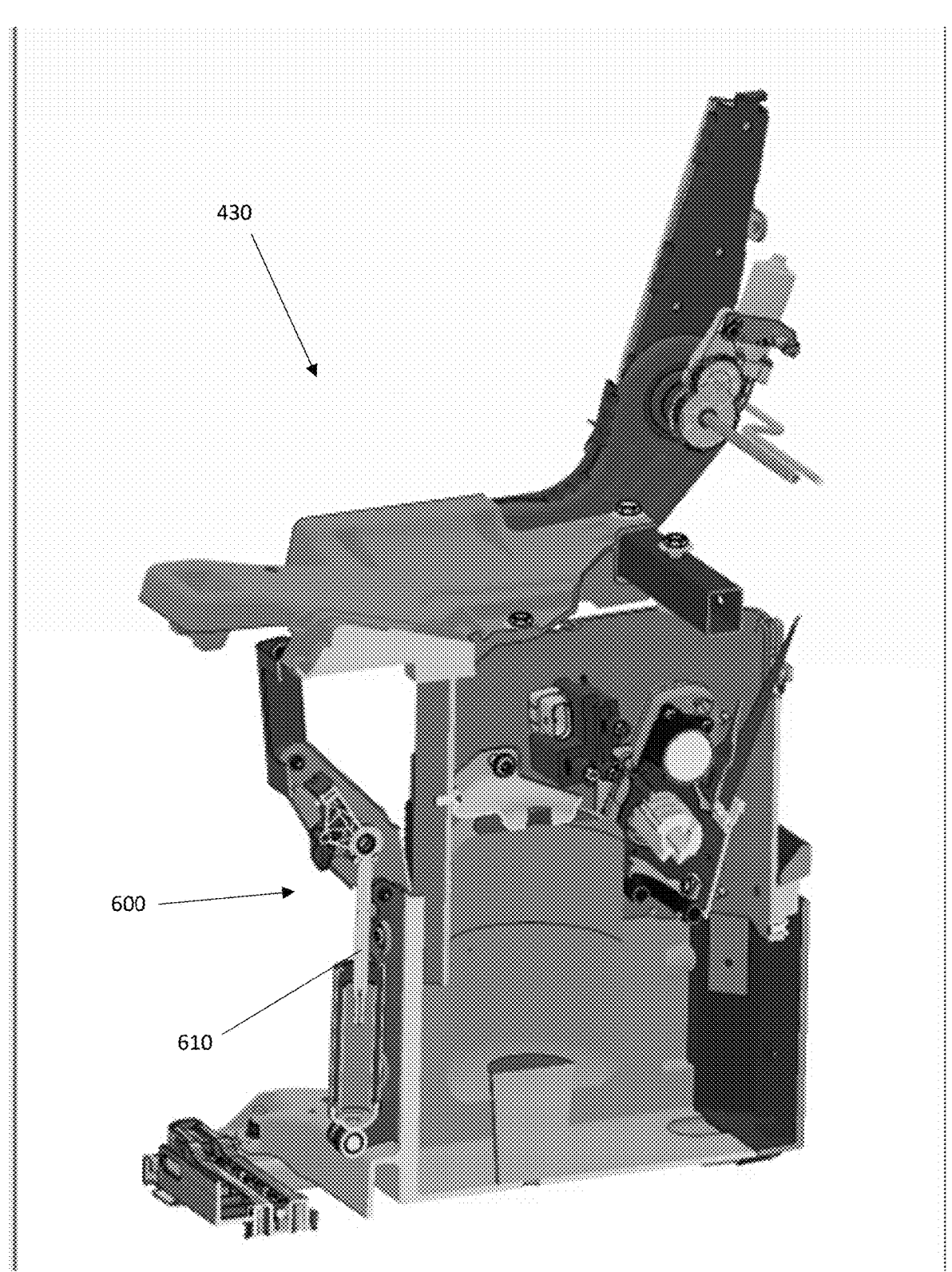
FIG. 6C depicts a cross-sectional view of the system deployed in a vehicular seat in a fully extended state, in accordance with an embodiment of the current disclosure.

Referring now to FIGS. 6B and 6C, there is shown a cross-sectional view of an illustrative system 100 deployed as a vehicular seat when the system 100 is in a partially compressed state 420 and a fully extended state 430, respectively. As shown by comparing the two states 420, 430, the position of the crank-slider linkage 610 may be related to the position of the spring 140. When the spring 140 extends, the crank-slider linkage 610 may extend. When the spring 140 compresses, the crank-slider linkage 610 may compress. In some embodiments, the rate of the spring 140 and the rate of the crank-slider linkage 610 may be different.

Figure 7:
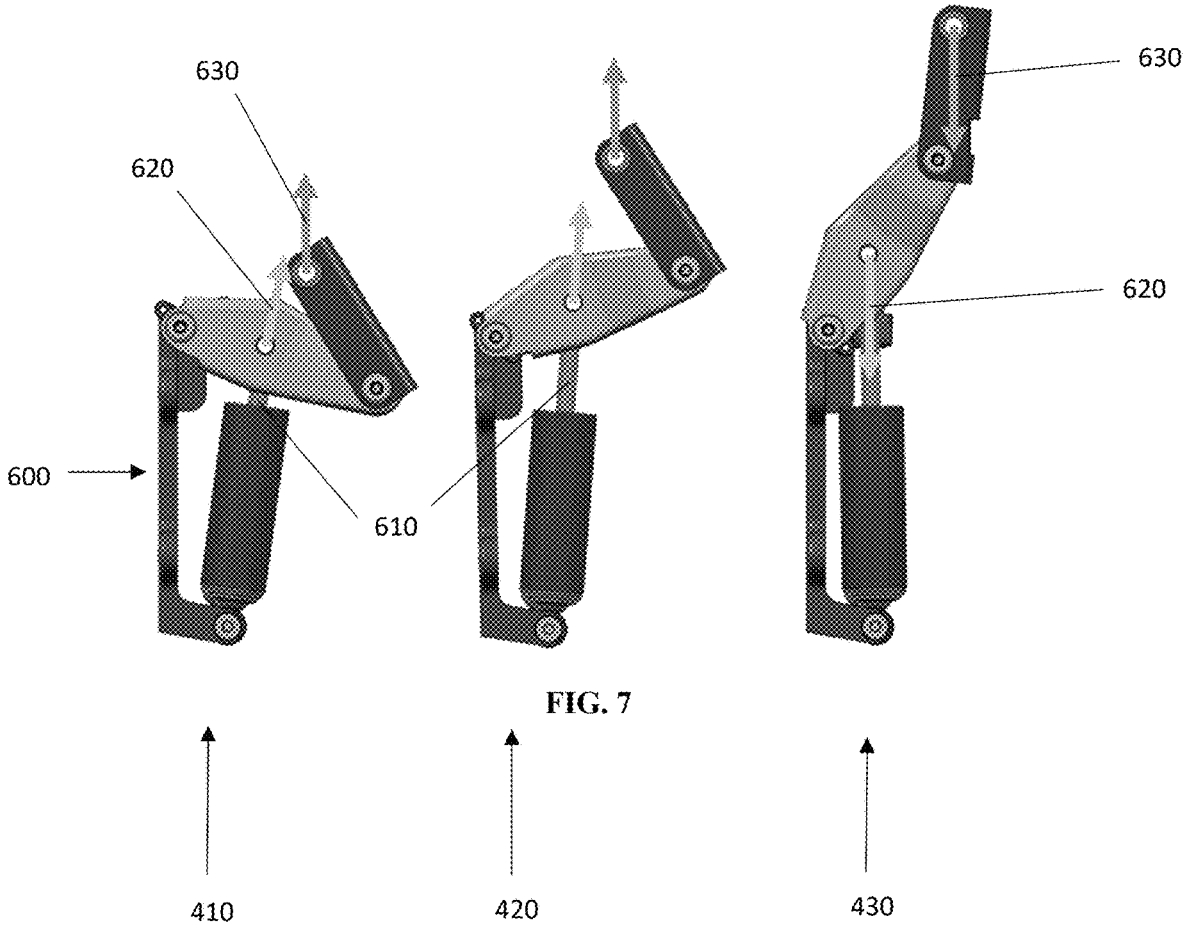
FIG. 7 depicts a damper subassembly with force vectors throughout seat travel, in accordance with an embodiment of the current disclosure.

Referring now to FIG. 7, there is shown a damper subassembly 600 with force vectors 620, 630 in various states 410, 420, 430 of seat travel. In a fully compressed state 410, the damper force 620 from the crank-slider linkage 610 may be in a generally +Z direction. The seat force 630 on the seat pan 105 may also be in a generally +Z direction. In a partially compressed state 420, the damper force 620 from the crank-slider linkage 610 may be in a generally +Z direction. The seat force 630 on the seat pan 105 may also be in a generally +Z direction. However, in a fully extended state 430 the damper force 620 from the crank-slider linkage 610 may be in a generally-Z direction. The seat force 630 on the seat pan 105 may also be in a generally-Z direction. The reason for these force changes is having a crank-slider linkage 610 as part of the damper subassembly 600. The crank-slider linkage 610 provides a progressive damping response to seat suspension travel, thus increasing the magnitude of the damping force at the seat when approaching the fully extended state 430. The progressive damping response provides for deceleration of the sprung mass, which decreases the likelihood of the rear end stop 220 contacting the overhang 510 during high impact road travel.

Figure 8:
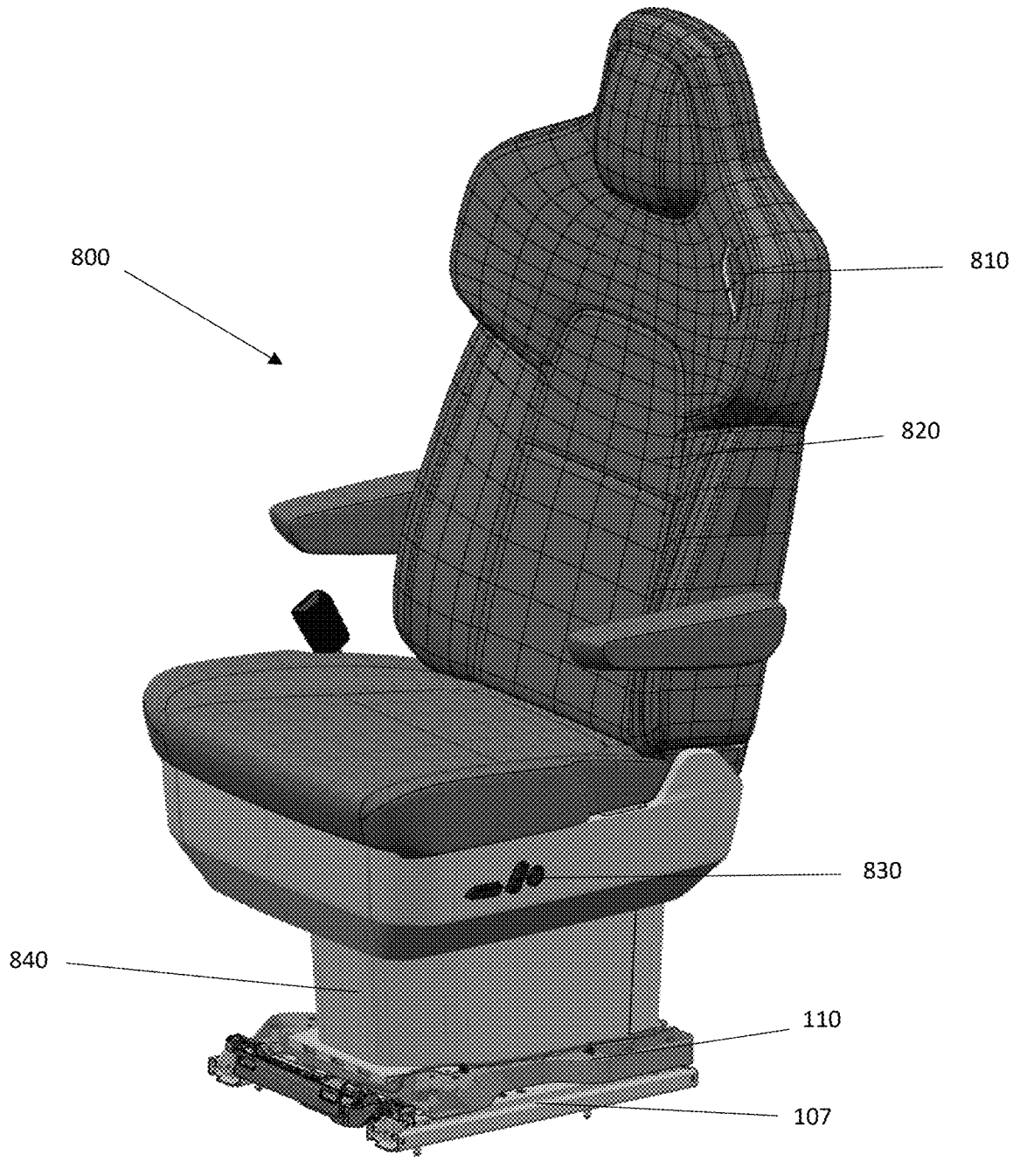
FIG. 8 depicts an illustrative vehicular seat connected to a vehicular seat suspension system in accordance with an embodiment of the current disclosure.

Referring now to FIG. 8, there is shown an illustrative vehicular seat 800 with a vehicular seat suspension system 100 deployed therein. In some embodiments, there may be a hole 810 in the seat back 820 configured to receive a seatbelt from the seatbelt retractor 160. In some embodiments, the vehicular seat 800 may have controllers 830 located on a surface of the seat configured to electronically control the position of the vehicular seat 800. In some embodiments, the vehicular seat 800 may have at least one manual controller located in at least one location adjacent the vehicular seat 800. A person holding ordinary skill in the art will understand the locations of the manual controllers. In some embodiments, a protective cover 840 may be inserted surrounding the outer element 110 and the damper subassembly 600. In some embodiments, the protective cover 840 may be coupled to the outer element 110. In some embodiments, the protective cover 840 is removable, which allows for access to the system 100 such that the system 100 may be maintained.

This disclosure is not limited to the particular systems, devices and methods described, as these may vary. The terminology used in the description is for the purpose of describing the particular versions or embodiments only and is not intended to limit the scope of the disclosure.

The following terms shall have, for the purposes of this application, the respective meanings set forth below. Unless otherwise defined, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a," "an," and "the" include plural references, unless the context clearly dictates otherwise. Thus, for example, reference to an "element" is a reference to one or more elements and equivalents thereof known to those skilled in the art, and so forth.

As used herein, the term "about" means plus or minus 10% of the numerical value of the number with which it is being used. Therefore, about 50 mm means in the range of 45 mm to 55 mm.

As used herein, the term "consists of" or "consisting of" means that the device or method includes only the elements, steps, or ingredients specifically recited in the particular claimed embodiment or claim.

In embodiments or claims where the term "comprising" is used as the transition phrase, such embodiments can also be envisioned with replacement of the term "comprising" with the terms "consisting of" or "consisting essentially of."

While the present disclosure has been illustrated by the description of exemplary embodiments thereof, and while the embodiments have been described in certain detail, it is not the intention of the Applicants to restrict or in any way limit the scope of the appended claims to such detail. Additional advantages and modifications will readily appear to those skilled in the art. Therefore, the disclosure in its broader aspects is not limited to any of the specific details, representative devices and methods, and/or illustrative examples shown and described. Accordingly, departures may be made from such details without departing from the spirit or scope of the Applicant's general inventive concept.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

It is claimed:

1. A vehicular seat suspension system, comprising:
  an outer element adapted to be coupled to a floor of a vehicle;
  an inner element adapted to be coupled to a seat pan, the inner element configured to be slideably engaged within the outer element;

a spring housed within and coupled to the inner element, the spring being adapted to control vertical displacement of the inner element and the seat pan; and a seat belt retractor housed in the inner element, the seat belt retractor coupled to the inner element.

2. The vehicular seat suspension system of claim 1, further comprising at least two linear motion elements adapted to guide the vertical displacement of the inner element.

3. The vehicular seat suspension system of claim 2, wherein the at least two linear motion elements comprises four linear motion elements, wherein each linear motion element is located in one of four regions of the outer element.

4. The vehicular seat suspension system of claim 2, wherein the at least two linear motion elements comprise:

a linear bearing;

a cage, configured to retain the linear bearing;

a first race coupled to the outer element;

a second race coupled to the inner element; and a shim coupled between the second race and the inner element, the shim configured to absorb dimensional variation in a space between the inner element and the outer element;

wherein the linear bearing is configured to engage with the first race and the second race.

5. The vehicular seat suspension system of claim 2, wherein the at least two linear motion elements comprise:

a set of electromagnetic tracks engaged between the inner element and the outer element.

6. The vehicular seat suspension system of claim 1, further comprising:

a damper coupled to the seat pan, the damper being further coupled to the outer element.

7. The vehicular seat suspension system of claim 1, further comprising:

an interlocking mechanism engaged between the inner element and the outer element.

8. The vehicular seat suspension system of claim 7, wherein the interlocking mechanism comprises:

a T-shaped member coupled to the outer element; and a C-shaped feature on the inner element, the C-shaped feature adjacent the T-shaped member, the C-shaped feature adapted to engage with the T-shaped member.

9. The vehicular seat suspension system of claim 7, wherein the interlocking mechanism comprises:

a rear end stop coupled to the inner element; and an overhang coupled to the outer element, the overhang configured to engage with the rear end stop, such that the inner element may be prevented from exiting the outer element.

10. The vehicular seat suspension system of claim 1, wherein the outer element and the inner element are aluminum.

11. The vehicular seat suspension system of claim 1, wherein the spring is an air spring.

12. A vehicular seat suspension system, comprising:

an outer element adapted to be coupled to a floor of a vehicle;

an inner element adapted to be coupled to a seat pan, the inner element configured to slide within the outer element; and a vertical displacement member housed within and coupled to the inner element, the vertical displacement member being adapted to control vertical displacement of the inner element and the seat pan; and a damping member coupled to the seat pan, the damping member further coupled to the outer element.

13. The vehicular seat suspension system of claim 12, further comprising:

at least two linear motion elements adapted to guide the vertical displacement of the inner element.

14. The vehicular seat suspension system of claim 12, wherein the damping member provides a progressive damping response.

15. The vehicular seat suspension system of claim 12, wherein the damping member is coupled to an outside surface of the outer element.

16. The vehicular seat suspension system of claim 12, further comprising:

an interlocking mechanism engaged between the inner element and the outer element.

17. The vehicular seat suspension system of claim 12, further comprising:

a seat belt retractor housed in the inner element.

18. The vehicular seat suspension system of claim 12, wherein the vertical displacement member comprises an electromagnetic system.

19. A vehicular seat suspension system, comprising:

an outer element adapted to be coupled to a floor of a vehicle;

an inner element adapted to be coupled to a seat pan, the inner element configured to be slideably engaged within the outer element;

a spring housed within and coupled to the inner element, the spring being adapted to control vertical displacement of the inner element and the seat pan;

at least two linear motion elements adapted to guide the vertical displacement of the inner element;

a linear bearing;

a cage, configured to retain the linear bearing;

a first race coupled to the outer element;

a second race coupled to the inner element; and a shim coupled between the second race and the inner element, the shim configured to absorb dimensional variation in a space between the inner element and the outer element;

wherein the linear bearing is configured to engage with the first race and the second race.

20. The vehicular seat suspension system of claim 19, further comprising:

a damper coupled to the seat pan and the damper coupled to the outer element.

\* \* \* \* \*